United States Patent [19]

Ohki et al.

[11] Patent Number: 4,597,104
[45] Date of Patent: Jun. 24, 1986

[54] SELECTIVE CALL SIGNAL DETECTION CIRCUIT FOR MULTI-CHANNEL ACCESS TYPE RADIO RECEIVING STATION

[75] Inventors: Isaō Ōhki, Ichikawa; Yoshikazu Noritake, Sakura; Hitoshi Hachiga, Ichihara, all of Japan

[73] Assignee: Uniden Corporation, Ichikawa, Japan

[21] Appl. No.: 660,212

[22] Filed: Oct. 12, 1984

[30] Foreign Application Priority Data

Oct. 26, 1983 [JP] Japan ................................ 58-199193

[51] Int. Cl.⁴ .......................... H04B 7/00; H04Q 7/00
[52] U.S. Cl. ........................................ 455/32; 455/62; 455/166; 455/38; 340/825.03; 340/825.52
[58] Field of Search ..................... 455/31, 32, 33, 34, 455/38, 54, 62, 161, 166, 228; 179/2 E, 2 EB; 340/825.03, 825.52

[56] References Cited

U.S. PATENT DOCUMENTS

| | | | |
|---|---|---|---|
| 3,634,627 | 1/1972 | Vecentini | 455/34 |
| 3,739,102 | 6/1973 | Leonard | 179/2 EB |
| 3,913,017 | 10/1975 | Imaseki | 455/33 |
| 4,166,927 | 9/1979 | Hamaoki | 179/2 EB |
| 4,400,585 | 8/1983 | Kaman | 455/34 |
| 4,423,413 | 12/1983 | Da Silva | 455/32 |

Primary Examiner—Jin F. Ng
Attorney, Agent, or Firm—Oblon, Fisher, Spivak, McClelland & Maier

[57] ABSTRACT

A selective call signal detection circuit comprises a channel free/busy state detection circuit for scanning a plurality of communication channels to determine their respective free/busy states, a present-time channel free/busy state memory circuit for temporarily storing channel free/busy detection signals resulting from the aforementioned scanning of communication channels, a past-time channel free-busy state memory circuit for receiving into storage therein in the subsequent channel scanning cycle the channel free/busy detection signals of the previous scanning cycle formerly stored in the aforementioned present-time channel free/busy state memory circuit, and a comparison circuit for comparing the signals from the aforementioned present-time past-time channel free/busy state memory circuits thereby discriminating between a selective call signal addressed to a given receiving station and selective call signals addressed to other receiving stations. Since this selective call signal detection circuit permits quick discrimination between a channel in the state of normal communication and a channel in the state of selective call, it serves to enhance the efficiency of channel scanning.

5 Claims, 2 Drawing Figures

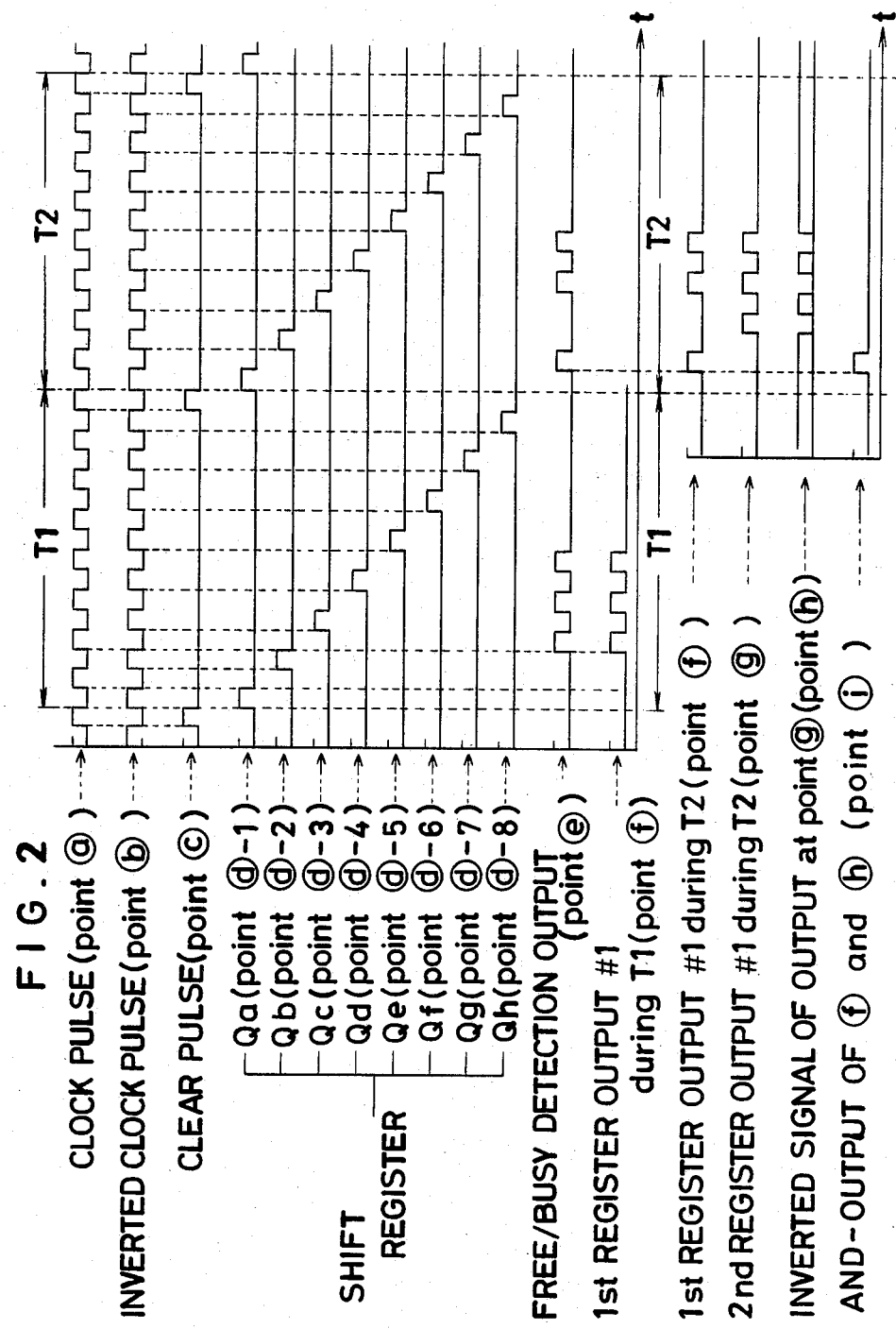

SELECTIVE CALL SIGNAL DETECTION CIRCUIT FOR MULTI-CHANNEL ACCESS TYPE RADIO RECEIVING STATION

BACKGROUND OF THE INVENTION

This invention relates to a selective call signal detection circuit for selective high-speed detection of radio call signals at a multi-channel access radio receiving station, and more particularly to a selective call signal detection circuit for quickly discerning and detecting selective call signals at a mobile radio receiving station of the circulation non-stationary type, among other types of the multi-channel access systems.

Among mobile radio systems in recent use is one called a multi-channel access system. For the purpose of ensuring efficient use of radio channels, the individual receiving stations of this system share a plurality of channels from among which one not in use is automatically selected. The following methods have been so far devised for a given station in this system to put a call through to a desired receiving station.

(1) Call channel method—In this method a specific channel is assigned exclusively for calls so that mobile stations, while not engaging in communication, wait for calls through this specific channel.

(2) Circulation stationary method—In this method the base station keeps transmitting free line signals through a free channel and unengaged mobile stations wait for calls through this particular free communication channel.

(3) Circulation non-stationary method—In this method unengaged mobile stations sequentially scan all the channels and the transmitting station issues a selective call signal to a specific receiving station through any one of the unengaged channels. Each receiving station therefore continues to scan the channels until it identifies a channel which happens to be carrying a selective call signal addressed to themselves, whereafter it engages in communication through the channel.

This invention is directed to improvements in and concerning the third mentioned method.

Now, the method for selective call signal detection adopted conventionally in the receiving unit of this circulation non-stationary method (3) will be described. The receiving station continues sequentially scanning all the shared channels while discriminating between unengaged channels (channels in "free" state) and engaged channels (channels in "busy" state), and checking each of the channels in the "busy" state for a length of time proportional to the length of the selective call signal to determine whether or not the channel being checked is carrying its own selective call signal.

The most serious disadvantage of this conventional method of selective call signal discrimination resides in the fact that this method makes absolutely no discrimination between the "busy" channels which are already engaged in communication in the general sense of the word and "busy" channels through which selective call signals are currently in transmission. As regards the channels which are being used for general communication, this method wastes time checking these channels in spite of the fact that they never carry selective call signals.

This disadvantage will become more conspicuous when the description is given more specifically with numerical values.

Generally, a review of selective call signals in terms of composition or data format reveals that the call signals now in use consist of as many as 115 bits even in relatively short compositions. Specifically, the first 16 bits are bit synchronizing signals, the following 15 bits frame synchronizing signals, and the remaining 84 bits data proper to individual stations. The data transfer rate, even in a relatively rapid type, is 1200 bps. Under the conditions, the reading of one selective call signal requires at least 115/1200=95.8 ms of time. Moreover, in actuality, the receiving station does not always start receiving a given selective call signal from the very beginning of the bit synchronizing signal part thereof at the time that the receiving station switches itself to the particular channel carrying that selective call signal. Instead, there are times when the transmission of data has already been started at the moment that the receiving station is switched to that particular channel. The time required by the receiving station in completing full test of one channel, therefore, is twice the length of the aforementioned selective call signal, namely a time slightly over 190 ms.

The time for switching from one channel to another normally takes slightly over 8 ms. It is seen, therefore, that the time required for detailed checking of one channel is about 200 ms.

Let us assume a system wherein, out of a total of 40 channels, 20 channels are in the "busy" state and only 5 of these 20 busy channels are being used for transmitting selective call signals. This means that of the 20 "busy" channels, 15 are already being used for normal communication.

Under this condition, the conventional method as already described treats the channels already used for normal communication and the channels currently conveying selective call signals equally as channels in the "busy" state and merely discriminates these "busy" channels from the channels in the "free" state. If the time required for the discrimination between the free/busy states is assumed to be 5 ms, the time required for one complete cycle for sweeping all the channels will be found by the following calculation to be slightly over 4 seconds:

$$200 \text{ (ms)} \times 20 + [(8+5)] \text{ (ms)} \times 20 = 4260 \text{ (ms)}$$

As is evident from the foregoing description, in the first term of the lefthand member of the equation, the time spent on the 15 channels, namely about 3 seconds' time, is clearly wasted. If the method were capable of discriminating between the group of channels which are already being used for normal communication and the group of channels currently conveying selective call signals, the foregoing equation would be altered to the following form:

$$200 \text{ (ms)} \times 5 + [(8+5)] \text{ (ms)} \times 35 = 1455 \text{ (ms)}$$

In this case, therefore, the time required for one complete cycle for sweeping the channels will be found to be slightly below one and a half seconds.

SUMMARY OF THE INVENTION

The present invention aims to take advantage of the vast difference between the two sets of conditions considered above. An object of this invention, therefore, resides in avoiding spending time wastefully by adopting a novel method of discrimination, which not only discriminates between channels in the "free" state and channels in the "busy" state but also effected discrimination between channels which are "busy" because they are already being used for normal communication and channels which are busy because they are now in the process of conveying selective call signals.

To accomplish the object described above, the selective call signal detecting circuit of the present invention comprises a past-time channel free/busy state detection and memory circuit for detecting and memorizing the channel free/busy state of each of the channels during the preceding cycle of channel scanning, a present-time channel free/busy state detection and memory circuit for generating the channel free/busy state of each of the channels during the present cycle of channel scanning, and a past-time present-time channel free/busy state comparison circuit for comparing data on the channel free/busy state from the past-time channel free/busy state detection and memory circuit and data on the channel free/busy state from the present-time channel free/busy state detection and memory circuit with respect to each of the channels, the aforementioned comparison circuit being adapted to issue a selective call signal detection signal when, in any of the channels, there occurs a change from the "free" state of channel in the past-time detection to the "busy" state of channel in the present-time detection.

Since this selective call signal detecting circuit of the present invention enables the receiving station to determine whether or not the relevant channel is conveying the selective call signal addressed to itself by virtue of the aforementioned selective call signal detection signal, it permits a striking reduction in the time required for scanning the channels.

The other objects and characteristics of the present invention will become apparent from the further disclosure of the invention to be given in the following detailed description of a preferred embodiment, with reference to the accompanying drawings.

BRIEF DESCRIPTION OF THE DRAWINGS

FIG. 2 is an explanatory diagram illustrating signal waveforms in the essential part of the circuit of FIG. 1.

DESCRIPTION OF THE PREFERRED EMBODIMENTS

Figure 1:
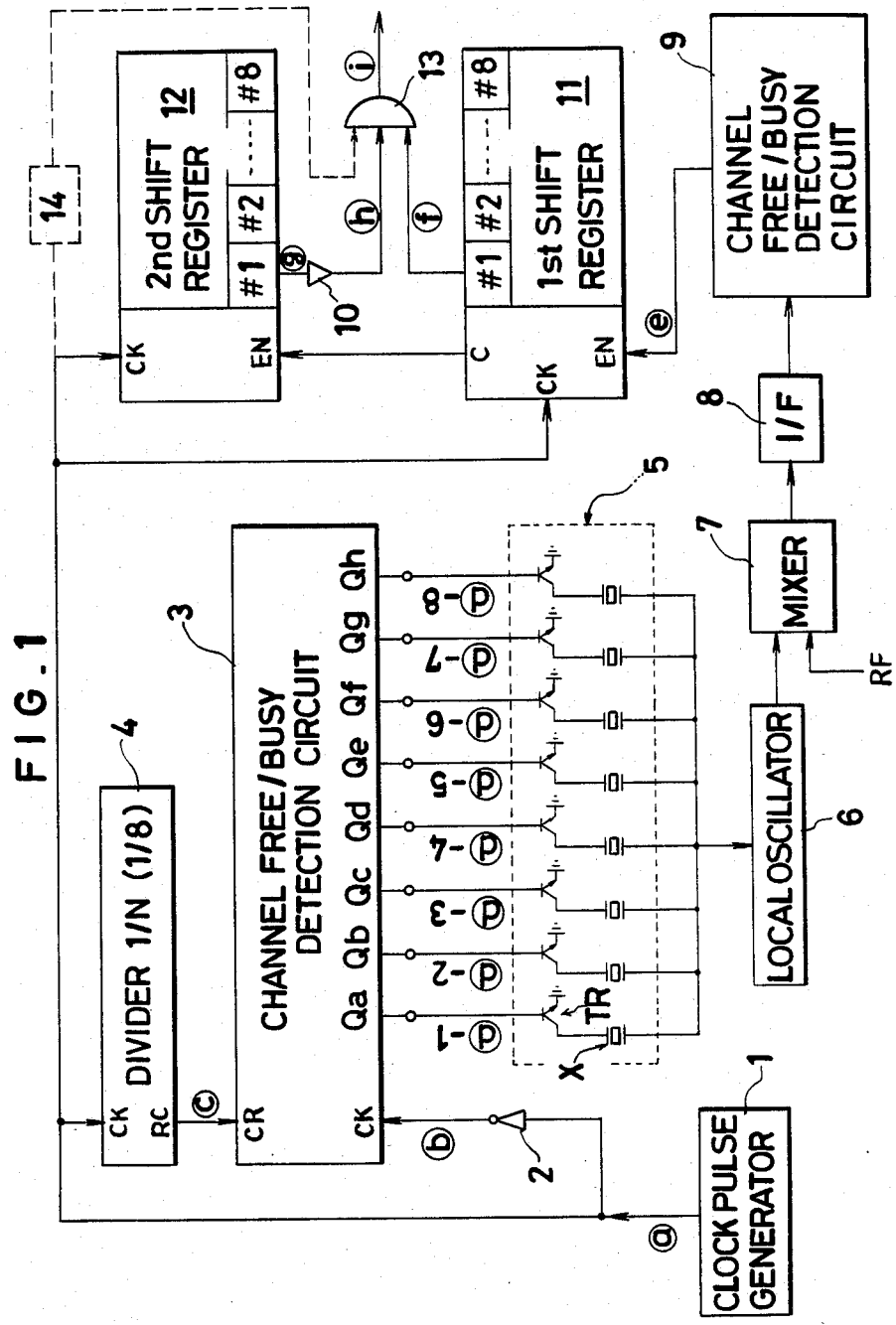
FIG. 1 is a schematic circuit diagram of one embodiment of the present invention.

This invention permits a receiving station in the multi-channel access communication system to effect quick discrimination of selective call signals addressed to itself and enables a notable reduction in the time required for scanning the individual channels by enabling the discrimination to be effected not only between channels in the "free" state and channels in the "busy" state but also between channels which are "busy" because they are being used for normal communication and channels which are "busy" because they are transmitting selective call signals.

In the case of the channels which are in the "busy" state, those which are being used for normal communication and those which are currently being used to transmit selective call signals can be discriminated on the principle found by the inventors.

When a certain channel is being used for normal communication, it may be safely concluded that the condition of engagement or the "busy" state has continued for a fairly long period as viewed on the normal clock level. In other words, in the aforementioned repeated scanning of all the channels, if a certain channel continues to be in the "busy" state over at least two successive cycles of scanning, it can be safely concluded that this channel is now in the state of normal communication. In a channel in which transmission of a selective call signal has just started, this channel can be presumed to have been in the "free" state in the immediately preceding cycle. When there is a channel which was found in the "free" state in the preceding cycle of scanning and which is found in the "busy" state in the present cycle of scanning, it is proper to conclude that this particular channel is now in the process of transmitting a selective call signal.

This knowledge has led the inventors to conceive the following construction.

(1) A circuit is installed which scans all the channels, determines whether or not each of the channels is in service, namely determines whether each channel is in the "busy" or in the "free" state, and memorizes the states of the channels.

(2) The scanning is continued in the second cycle, similarly to the first cycle, to determine whether the channels are in the "busy" state or in the "free" state.

(3) The present-time channel free/busy states found during the second cycle of scanning (2) and the memorized or past-time channel free/busy states found during the first cycle of scanning (1) are compared channel by channel. As the result of this comparison, the channels which have remained in the "free"-"free" state and in the "busy"-"busy" state and the channels which have changed from the "busy" to the "free" state are treated as channels which have involved no selective call signal or which have completed communication and are allowed to be scanned in the next cycle and only the channels which have changed from the "free" to the "busy" state are selected and indicated by issuance of a selective call signal detection signal.

This concept constitutes itself the fundamental construction of the circuit of the present invention. By this invention, the new signal called the "selective call signal detection signal" can be introduced into the selective call circuit system of this type as described above and only the channels with respect to which this selective call signal detection signal has been issued can be subjected to determination as to whether or not the selective call signals are addressed to the relevant receiving station. In this manner, the time required for scanning the channels is notably reduced. The method for this determination and the circuit used therefor are not different from those already known to the art. These are matters on which this invention has no direct bearing. In short, the present invention is characterized by being capable of issuing selective call signal detection signals for discriminating between channels currently in the process of transmitting selective call signals and channels currently being used for normal communication thereby avoiding the conventional waste of causing all the channels in the "busy" state to be subjected to the aforementioned determination as to the selective call signal.

Now, a preferred embodiment of this invention will be described below, with reference to the accompanying drawings. First, to permit sequential scanning of all the channels, there is provided a local oscillator 6 capable of producing a stepwise variable local oscillation frequency which is fed to a mixer 7 for establishing a beat with the high-frequency input RF. The present embodiment is described as using a total of eight channels for the simplicity of description. This invention is not, of course, limited as to the number of channels involved. In the present embodiment, the device has the following arrangement.

For reasons that will be given later, the output clock pulse (point ⓐ; refer to the waveform of the relevant point indicated in FIG. 2) of a clock pulse generator 1 is inverted by an inverter 2, for example. The inverted clock pulse (point ⓑ) is given to the clock input of a shift register 3 for scanning 8-bit series input/parallel output type channels. In the following description, positive logicals are considered for the simplicity of description and their respective rises are taken as significant unless otherwise specified. The various signal points ⓐ through ⓘ are also taken as designating the respective symbols of signals on the respective points.

Each time the inverted clock pulse is received, therefore, the state of logical "1" is shifted as indicated clearly in FIG. 2 sequentially from the least significant pulse output Qa to the most significant pulse output Qh of the shift register 3 for scanning a given channel.

In the meantime, to the clear input of the channel scanning shift register 3 is connected the divided output Rc of an 1/N frequncy divider 4. To the frequency divider 4 is fed the clock pulse of an uninverted point ⓐ. In the present embodiment, since the number of channels is 8 as described above, N=8 is selected. Generally, a suitable preset counter may be utilized as a ⅛ frequency divider.

The bit outputs from the channel scanning shift register 3 are fed to local oscillation frequency switch circuits 5 for generating local oscillation frequencies corresponding to the individual channels. Although the construction of the shift register 3 itself can be freely selected, the shift register 3 in the illustrated embodiment is so constructed that corresponding local oscillation frequencies will be obtained by turning on the transistors TR as switching elements by the individual bit outputs from the register 3 thereby selectively grounding the terminals of crystals X of the corresponding channels.

Now, the operation of the aforementioned arrangement will be described, starting from its initial condition. As shown at the beginning of the first scanning cycle T1 of the diagram of FIG. 2, the entry of the first pulse of the inverted clock pulse ⓑ in the channel scanning shift register 3 causes the appearance of a logical "1" at the first output Qa of the shift register 3, with the result that the local oscillation frequency of the first channel is issued from the local oscillator 6 and forwarded to the mixer 7 through the local oscillation frequency switch circuit 5. Then, when the second pulse of the inverted clock pulse ⓑ enters the channel scanning shift register 3, the register 3 produces a shifting motion to raise the output Qb in the place of the output Qa, with the result that the local oscillation frequency for the second channel is fed out of the local oscillator 6. This procedure is repeated sequentially until the output Qh for the local oscillation frequency selection of the eighth channel.

As the inverted clock pulse ⓑ which has raised the bit Qh for the eighth channel falls, the uninverted clock pulse ⓐ rises. Since this rise equals the eighth clock input on the part of the ⅛ frequency divider (the clock pulse ⓐ is delayed by one half of the clock cycle as viewed relative to the inverted clock pulse (ⓑ), a clear pulse ⓒ at the countup output of the ⅛ frequency divider 4 or the divider output terminal RC, with the result that the channel scanning shift register 3 is cleared and the first scanning cycle T1 is terminated.

When the next inverted clock pulse ⓑ is issued, the aforementioned clear pulse ⓒ falls and, at the same time, the first pulse reaches the channel scanning shift register 3 to start the second scanning cycle T2 similarly to the first scanning cycle T1 described above. The procedure is repeated until the scanning cycle is completed on all the channels involved.

During each scanning cycle, the relevant channel is examined by the channel free/busy detection circuit 9 to determine whether or not the channel is carrying thereon any electric wave, namely whether the channel is in the "free" state or in the "busy" state. A noise detector which is known to the art may be utilized as the channel free/busy detection circuit 9, for example. The noise detector permits discrimination between the "free" state and "busy" state of the channel in accordance with the magnitude of the noise accompanying the signal forwarded from the mixer 7, optionally via an intermediate frequency step 8. The present embodiment is assumed to have a free/busy detection circuit 9 of such design that the circuit 9 will issue the output ⓔ of logical "1" when the channel is in the "busy" state.

The part of the characteristic construction of this invention which determines whether a given channel in the "busy" state is in the state of normal communication or is in the process of conveying a selective call signal mainly comprises a present-time channel free/busy state memory circuit for issuing and memorizing a channel free/busy state of a given channel during the current channel scanning cycle and a past-time channel free/busy state memory circuit for issuing and memorizing a channel free/busy state of the channel during the preceding channel scanning cycle. In the present embodiment, the first shift register 11 is utilized as the present-time channel free/busy state detection circuit and the second shift register 12 as the past-time channel free/busy state detection and memory circuit. The channel free/busy detection outputs from the aforementioned channel free/busy detection circuit 9 are sequentially admitted into the first shift register 11 as synchronized with the clock pulse ⓐ. The parallel outputs from the first shift register 11 and the second shift register 12 are denoted, for the sake of convenience, by the symbols #1–#8. The overflow or carry signals from the terminal C which accompany the ninth and following inputs to the first shift register 11 as counted from the initial state are sequentially given to the second shift register 12. As a result, the first shift register 11 indicates the channel free/busy states detected during the current channel scanning cycle T2 and the second shift register 12 the channel free/busy states detected during the preceding channel scanning cycle T1. A typical example will be cited below for more specific description.

Let us now assume that the scanning of all the channels during the first scanning cycle T1 has found the first channel and the fifth through eighth channels to be each in the "free" state and the second and third channels to be each in the "busy" state. A look at the first bit #1 in the first shift register 11 along the course of time from the outset of the first scanning cycle shows that a train of bits "01110000" sequentially appears as the output ⓖ. At the end of the first scanning cycle T1, therefore, the data item "0" of the first channel, namely the channel "free" state, is memorized in the output #8.

Then, at the start of the second scanning cycle, the first channel is selected first and the channel condition is similarly tested at the channel free/busy detection circuit 9. It is now assumed that as the result of the test, the first channel has now been detected to have changed to the "busy" state and the channel free/busy detection output ⓔ has been produced as a logical "1" as shown at the beginning of the second scanning cycle T2 in FIG. 2.

Consequently, this state is memorized in the first bit #1 of the first shift register 11. The entry of data in the first bit causes the contents of the #8 bit of the first shift register to be forced out of the carry terminal C and received into the first bit #1 of the second shift register 12.

The output ⓕ of the first bit of the first shift register 11 at this time represents the information as to the channel condition of the first channel at the current time in the current scanning cycle and the output ⓖ of the first bit of the second shift register 12 the information as to the channel condition of the first channel at the past time during the previous scanning cycle. Then the output ⓖ of the first bit of the second shift register 12 is inverted into the signal ⓗ by the inverter 10 and the signal ⓗ is combined with the output ⓕ of the first bit of the first shift register 11 to produce an AND output in the AND gate 13. Regarding the first channel, therefore, the selective call signal detection signal ⓘ is fed out as the logical "1" signal.

As already pointed out, when a given channel was found to be in the "free" state in the previous scanning cycle and it is found to be in the "busy" state in the current scanning cycle, this condition indicates that this channel is carrying thereon a selective call signal. Consequently, the signal ⓘ indicating this condition is generated in the first channel. Similarly in the second scanning cycle, the second, third, up to eighth channels are sequentially scanned and, in the meantime, the data on the channel conditions of each channel found in the previous or past scanning cycle and those found in the current scanning cycle are compared in the AND gate 13.

In the case of the operation illustrated in FIG. 2, it is illustrated by way of a model that in the second scanning cycle, the second channel is changed to the "free" state, the third and fourth channels remain in their "busy" state, and the fifth through eighth channels similarly remain in the "free" state. In this case, transmission of the selective call signal is detected only in the first channel and this detection is indicated by issuance of the selective call signal detection signal ⓘ as described above.

The fact that the second channel has changed from the "busy" state to the "free" state means that communication terminated in this channel in the meantime. The fact that the third and fourth channels have remained unchanged in the "busy" state means that communication is still continuing in these channels. The fact that the fifth through eighth channels have remained unchanged in the "free" state means that no selective call signals have been transmitted and no communication has continued in these channels.

With respect to the second through eighth channels, therefore, at their respective clock timings, the logical "0" naturally appears at the AND gate output side as is evidently inferred from the circuit construction described above.

To obtain a prescribed output timing, a delay circuit 14 for applying a suitable delay on the clock may be incorporated as indicated by an imaginary line in FIG. 2 and this delay circuit 14 may be used to effect required control of the AND gate 13.

A function equivalent to the circuit construction of the embodiment described above may be realized actually by using a microcomputer.

As described in detail above, the present invention provides a high-speed scanning circuit which enables the scanning of channels, on detecting a channel in the "busy" state because of engagement in communication, to skip that particular channel and move to the next channel and, thus, avoids spending time wastefully as in the conventional circuit. Moreover, the construction of the circuit is simple and reliable.

What is claimed is:

1. In a selective call signal detection circuit for use in each of receiving stations sharing a plurality of communication channels for discrimination between a selective call signal addressed to itself and selective call signals addressed to other receiving stations, the improvement comprising:
   a channel free/busy state detection circuit for sequentially scanning said communication channels and determining "free" and "busy" states thereof and for sequentially issuing channel free/busy state detection signals,
   a present-time channel free/busy state memory circuit for sequentially memorizing in a first cycle of channel scanning said channel free/busy state detection signals issued sequentially from said channel free/busy state detection circuit,
   a past-time channel free/busy state memory circuit for memorizing therein channel free/busy state detection signals temporarily memorized in said present-time channel free/busy state memory circuit thereby allowing said signals memorized in said present-time channel free/busy state memory to be used in a second cycle of channel scanning as channel free/busy state detecting signals of said first cycle of channel scanning, and
   a past-time present-time channel free/busy state comparison circuit for comparing data on channel free/busy state from said past-time channel free/busy state memory circuit and data on channel free/busy state from said present-time channel free/busy state memory circuit with respect to each of said communication channels,
   said comparison circuit being adapted to issue a selective call signal detection signal when, in any of the channels, there occurs a change from the "free" state of channel in the first cycle of channel scanning to the "busy" state of channel in the second cycle of channel scanning.

2. A selective call signal detection circuit according to claim 1, wherein said channel free/busy detection circuit comprises a mixer adapted to establish a beat between locally oscillated signals from a local oscillation circuit and high-frequency receiving input signals and a noise detector for detecting channel free/busy state with respect to the intermediate frequency from said mixer.

3. A selective call signal detection circuit according to claim 2, which further comprises a channel scanning shift register for sequentially issuing locally oscillated selective signals with respect to said communication channels upon reception of signals resulting from inversion of clock pulses from a clock pulse generator and divided signals resulting from division of said clock pulses by the number of channels and means for receiving said locally oscillated selective signals from said channel scanning shift register and, in response thereto, forwarding preset frequencies to said local oscillation circuit.

4. A selective call signal detection circuit according to claim 1, wherein said present-time channel free/busy state memory circuit comprises a first shift register and said past-time channel free/busy state memory circuit comprises a second shift register.

5. A selective call signal detection circuit according to any one of claims 1-4, wherein said comparison circuit comprises an AND gate for receiving the output from said present-time channel free/busy state memory circuit and the output from said past-time channel free/busy state memory circuit and, in response thereto, issues an AND output as a selective call signal.

* * * * *